United States Patent
Chu

(10) Patent No.: US 9,276,646 B2
(45) Date of Patent: Mar. 1, 2016

(54) METHOD OF MANAGING COOPERATING SET FOR COORDINATED MULTIPLE POINT TRANSMISSION AND RECEPTION AND RELATED COMMUNICATION DEVICE

(71) Applicant: HTC Corporation, Taoyuan County (TW)

(72) Inventor: Feng-Seng Chu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 276 days.

(21) Appl. No.: 13/868,116

(22) Filed: Apr. 23, 2013

(65) Prior Publication Data

US 2013/0288731 A1    Oct. 31, 2013

Related U.S. Application Data

(60) Provisional application No. 61/639,087, filed on Apr. 27, 2012, provisional application No. 61/639,092, filed on Apr. 27, 2012.

(51) Int. Cl.
*H04B 7/02* (2006.01)

(52) U.S. Cl.
CPC ..................... *H04B 7/024* (2013.01)

(58) Field of Classification Search
CPC ....................................... H04B 7/024
See application file for complete search history.

(56) References Cited

U.S. PATENT DOCUMENTS

| | | | |
|---|---|---|---|
| 8,305,987 B2 | 11/2012 | Fong | |
| 2012/0027108 A1* | 2/2012 | Hong et al. | 375/260 |
| 2012/0135766 A1* | 5/2012 | Garavaglia et al. | 455/509 |
| 2012/0147773 A1* | 6/2012 | Kim et al. | 370/252 |
| 2012/0287875 A1* | 11/2012 | Kim et al. | 370/329 |
| 2013/0088986 A1* | 4/2013 | Xiao et al. | 370/252 |
| 2013/0114524 A1* | 5/2013 | Sirotkin et al. | 370/329 |
| 2013/0223272 A1* | 8/2013 | Tao et al. | 370/252 |
| 2014/0219115 A1* | 8/2014 | Etemad et al. | 370/252 |

FOREIGN PATENT DOCUMENTS

| | | |
|---|---|---|
| WO | 2011013986 A2 | 2/2011 |
| WO | 2011115421 A2 | 9/2011 |

OTHER PUBLICATIONS

Office action mailed on Nov. 4, 2014 for the U.S. Appl. No. 13/868,086, filed Apr. 22, 2013, p. 1-15.
3GPP TR 36.819 V11.1.0, Dec. 2011.
3GPP TS 36.211 V10.2.0, Jun. 2011.
3GPP TS 36.214 V10.1.0, Mar. 2011.

* cited by examiner

*Primary Examiner* — David Bilodeau
(74) *Attorney, Agent, or Firm* — Winston Hsu; Scott Margo

(57) ABSTRACT

A method of managing cooperating set for a network in a wireless communication system supporting a technology of coordinated multipoint (CoMP) transmission/reception includes periodically updating a cooperating set of CoMP for a user equipment of the wireless communication system; wherein the cooperating set of CoMP represents a set of transmission points directly and/or indirectly participating in data transmission to the user equipment in the wireless communication system.

20 Claims, 4 Drawing Sheets

METHOD OF MANAGING COOPERATING SET FOR COORDINATED MULTIPLE POINT TRANSMISSION AND RECEPTION AND RELATED COMMUNICATION DEVICE

CROSS REFERENCE TO RELATED APPLICATIONS

This application claims the benefit of U.S. Provisional Application No. 61/639,087, filed on Apr. 27, 2012 and entitled "Method and apparatus to manage cooperating set in CoMP", and U.S. Provisional Application No. 61/639,092, filed on Apr. 27, 2012 and entitled "Method and Apparatus to configure CSI-RS for CoMP interference measurement", the contents of which are incorporated herein in their entirety.

BACKGROUND OF THE INVENTION

1. Field of the Invention

The present invention relates to a method used in a wireless communication system and related communication device, and more particularly, to a method of managing cooperating set for coordinated multiple point (CoMP) transmission and reception and related communication device.

2. Description of the Prior Art

A long-term evolution (LTE) system supporting the 3GPP Rel-8 standard and/or the 3GPP Rel-9 standard has been developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicates with a core network including a mobility management entity (MME), a serving gateway, etc., for Non Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a user equipment and an eNB to communicate with each other in the LTE-A system, the user equipment and the eNB must support standards developed for the LTE-A system, such as the 3GPP Rel-10 standard or later versions.

When the CoMP is configured to a user equipment and multiple transmission points (e.g. a base station, a relay node, a pico eNB, a home eNB, or a remote antenna of a base station), the user equipment may communicate with the transmission points simultaneously, i.e., access a service via all or part of the transmission points. The set of transmission points directly and/or indirectly participating in data transmission to a user equipment in a time-frequency resource is defined as a cooperating set for the user equipment. In general, the transmission points from which the user equipment can reliably receive signals are selected to form the cooperating set for this user equipment.

Usually, the user equipment may move around to different positions within the coverage of the wireless communication system, or even move outside the coverage of the wireless communication system. The channel conditions of the user equipment to the transmission points may vary from time to time such that the link quality in the wireless communication system may not be in an optimized state. Furthermore, when multiple user equipments are involved in the communication system of the CoMP technology, a new user equipment may come or appear in the wireless communication system, or conversely, an original user equipment may move out or be turned off, so the connection services between the user equipments and the transmission points should be adjusted in response to variations of the channel conditions. However, in the prior art, there is no clear method to solve the above issues for CoMP technology. Therefore, there is a need for improvement of the prior art.

SUMMARY OF THE INVENTION

The present invention is to provide a method capable of handling different kinds of variations in the communication system and determining the cooperating set for the user equipments in the CoMP technology.

The present invention discloses a method of managing cooperating set for a network in a wireless communication system supporting a technology of coordinated multipoint (CoMP) transmission and reception. The method includes periodically updating a cooperating set of CoMP for a user equipment of the wireless communication system, wherein the cooperating set of CoMP represents a set of transmission points directly and/or indirectly participating in data transmission to the user equipment in the wireless communication system.

The present invention further discloses a communication device for managing cooperating set for a network in a wireless communication system supporting a technology of coordinated multipoint (CoMP) transmission and reception. The communication device includes a processing means, a storage unit, and a program code. The program code, which is stored in the storage unit, instructs the processing unit to periodically update a cooperating set of CoMP for a user equipment of the wireless communication system, wherein the cooperating set of CoMP represents a set of transmission points directly and/or indirectly participating in data transmission to the user equipment in the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
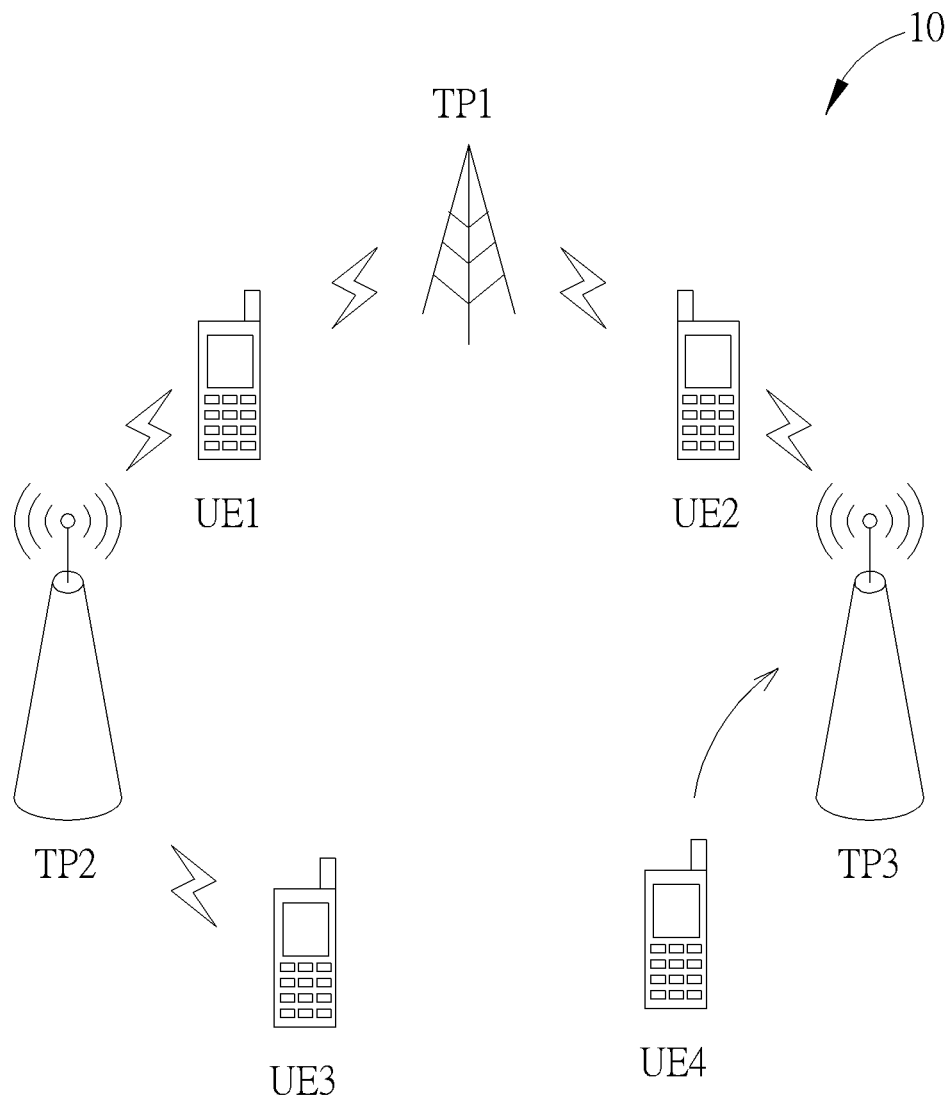
FIG. 1 is a schematic diagram of a wireless communication system according to an example of the present invention.

Please refer to FIG. 1, which shows a schematic diagram of a conventional wireless communication system 10 in the CoMP technology. The wireless communication system 10 is briefly composed of three transmission points TP1-TP3 (i.e., 3 cells), and three user equipments UE1-UE3. The wireless communication system 10 maybe a wideband code division multiple access (WCDMA) system such as a universal mobile telecommunications system (UMTS). Alternatively, the wireless communication system 10 may be an orthogonal frequency-division multiplexing (OFDM) system and/or an orthogonal frequency-division multiple access (OFDMA) system, such as a long term evolution (LTE) system or an LTE-Advanced (LTE-A) system.

The transmission points TP1-TP3 perform coordinated multipoint transmission/reception (CoMP) (i.e., multi-cell transmissions and receptions) with the user equipments UE1-UE3. That is, the transmission points TP1-TP3 can jointly perform multi-cell transmissions and receptions with a user equipment to improve throughput of the user equipment. Some or all of the transmission points TP1-TP3 can be serving points (i.e., serving cells) according to signal quality between the transmission points TP1-TP3 and the user equipments UE1-UE3.

Different types of CoMP schemes or a hybrid scheme may be used in the wireless communication system 10. For example, a user equipment in the wireless communication system 10 may be served by the cooperation of some or all of the transmission points TP1-TP3 with Dynamic point selection/muting (DPS/DPB), as on certain radio resources only one of the transmission points transmits data to the user equipment while the other transmission points are muted. A user equipment may also be served by the cooperation of some or all of the transmission points TP1-TP3 with Joint Transmission (JT). A user equipment in the wireless communication system 10 may also be served with Coordinated Scheduling/Beamforming (CS/CB) or a hybrid category of JP and CS/CB. A user equipment in the wireless communication system 10 may also be served in a legacy way.

Please note that the user equipments UE1-UE3 and the transmission points TP1-TP3 are simply utilized for illustrating the structure of the wireless communication system 10. Practically, a transmission point in the wireless communication system 10 may be a Node-B (NB) (i.e., macrocell base station (BS)) in a universal terrestrial radio access network (UTRAN) of the UMTS or an evolved NB (eNB) in an evolved UTRAN (E-UTRAN) of the LTE system or the LTE-A system, and is not limited herein. Alternatively, the transmission point maybe an NB or an eNB with small coverage or a newly developed BS with all or part of functions of an NB or an eNB, e.g., a relay node, a pico eNB, home eNB, or a remote antenna of a macrocell BS. Besides, the transmission point may be a remote radio head (RRH) in the LTE-A system. The user equipments UE1-UE3 may be a mobile device such as a mobile phone, a laptop, a tablet PC, an electronic book, or a portable computer system.

Figure 2:
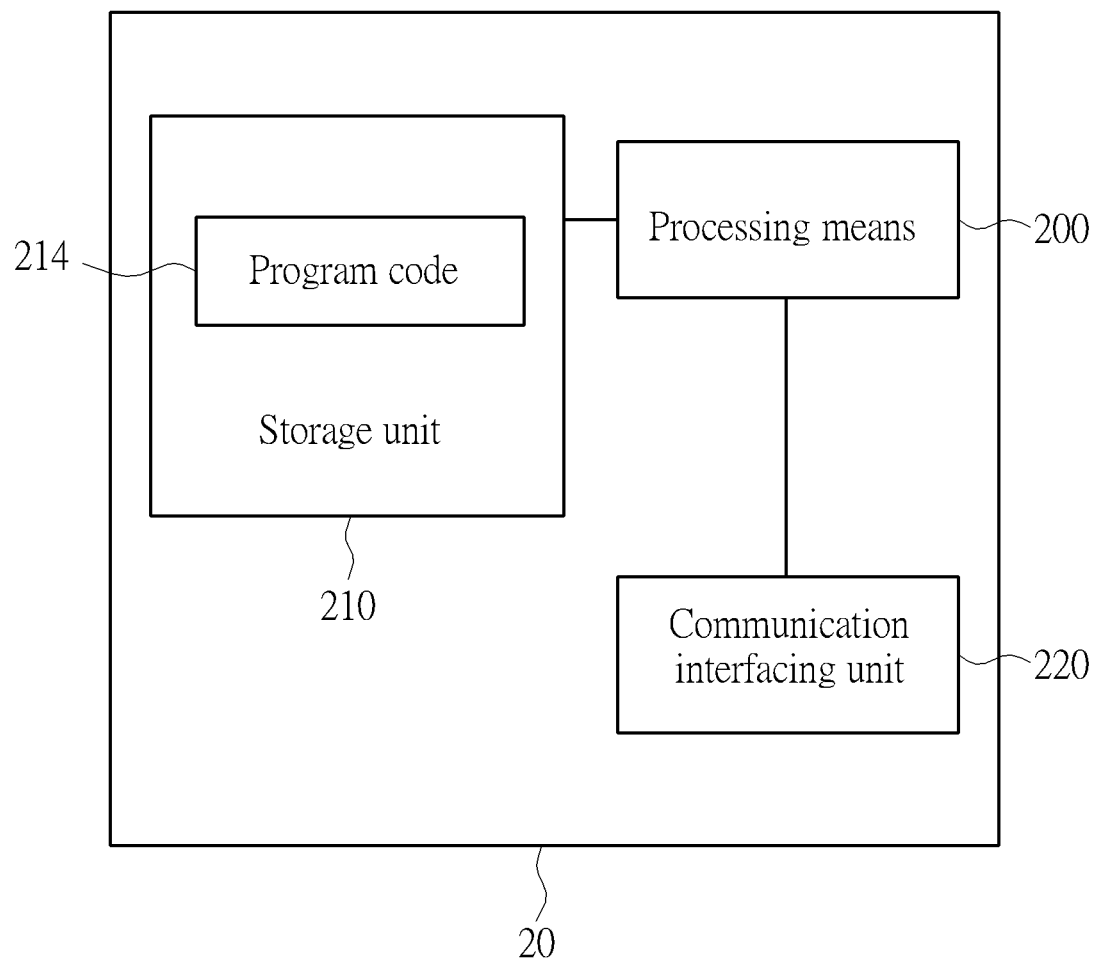
FIG. 2 is a schematic diagram of a communication device according to an example of the present invention.

Please refer to FIG. 2, which is a schematic diagram of a communication apparatus 20 according to an example of the present invention. The communication device 20 can be resided in a transmission point shown in FIG. 1, such as an eNB, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
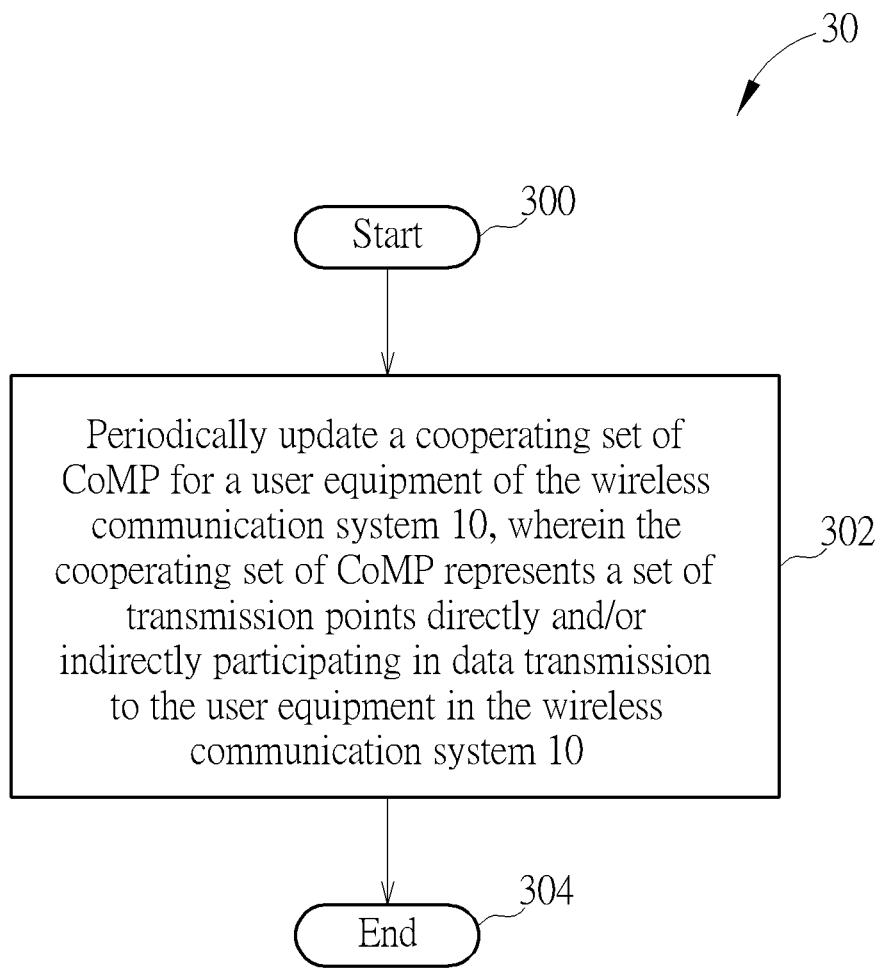
FIG. 3 is a flowchart of a process according to an example of the present invention.

Please refer to FIG. 3, which is a flowchart of a process 30 according to an example of the present invention. The process 30 is utilized in the wireless communication system 10 shown in FIG. 1 for managing cooperating set of the CoMP technology. The process 30 may be realized by the network through, for example, a central node (e.g. the transmission point TP1) among the set of the transmission points TP1-TP3. Alternatively, the process 30 may be realized by the network through the cooperation (e.g. exchanging coordination information) of serving points (i.e., serving cells) among some or all of the transmission points TP1-TP3. Furthermore, the process 30 may also be realized by a switching center such as a mobility management entity (MME) or a radio network controller (RNC), and is not limited herein. The process 30 is implemented by the communication device 20 and may be compiled into the program code 214. The process 30 includes the following steps:

Step 300: Start.

Step 302: Periodically update a cooperating set of CoMP for a user equipment of the wireless communication system 10, wherein the cooperating set of CoMP represents a set of transmission points directly and/or indirectly participating in data transmission to the user equipment in the wireless communication system 10.

Step 304: End.

According to the process 30, the network may update a cooperating set of CoMP, which is a set of transmission points directly and/or indirectly participating in data transmission to a user equipment, for the user equipment of the wireless communication system 10. Since a cooperating set is preferably determined based on channel conditions and the channel conditions may vary from time to time, the present invention is capable of managing and configuring the cooperating set that is optimized based on instantaneous channel conditions for each user equipment in the wireless communication system 10 at any time.

For example, after the process 30 is applied to the wireless communication system 10, the network may determine that the cooperating set for the user equipment UE1 consists of the transmission points TP1, TP2, the cooperating set for the user equipment UE2 consists of the transmission points TP1, TP3, and the cooperating set for the user equipment UE3 only consists of the transmission point TP2. Then, a new user equipment UE4 may come into the wireless communication system 10, which may influence the channel conditions between the transmission point TP3 and the user equipment UE2. With applying the process 30, the influence on the channel conditions may be obtained instantaneously so that the network determines and updates the cooperating set for the user equipments UE2, UE4.

Figure 4:
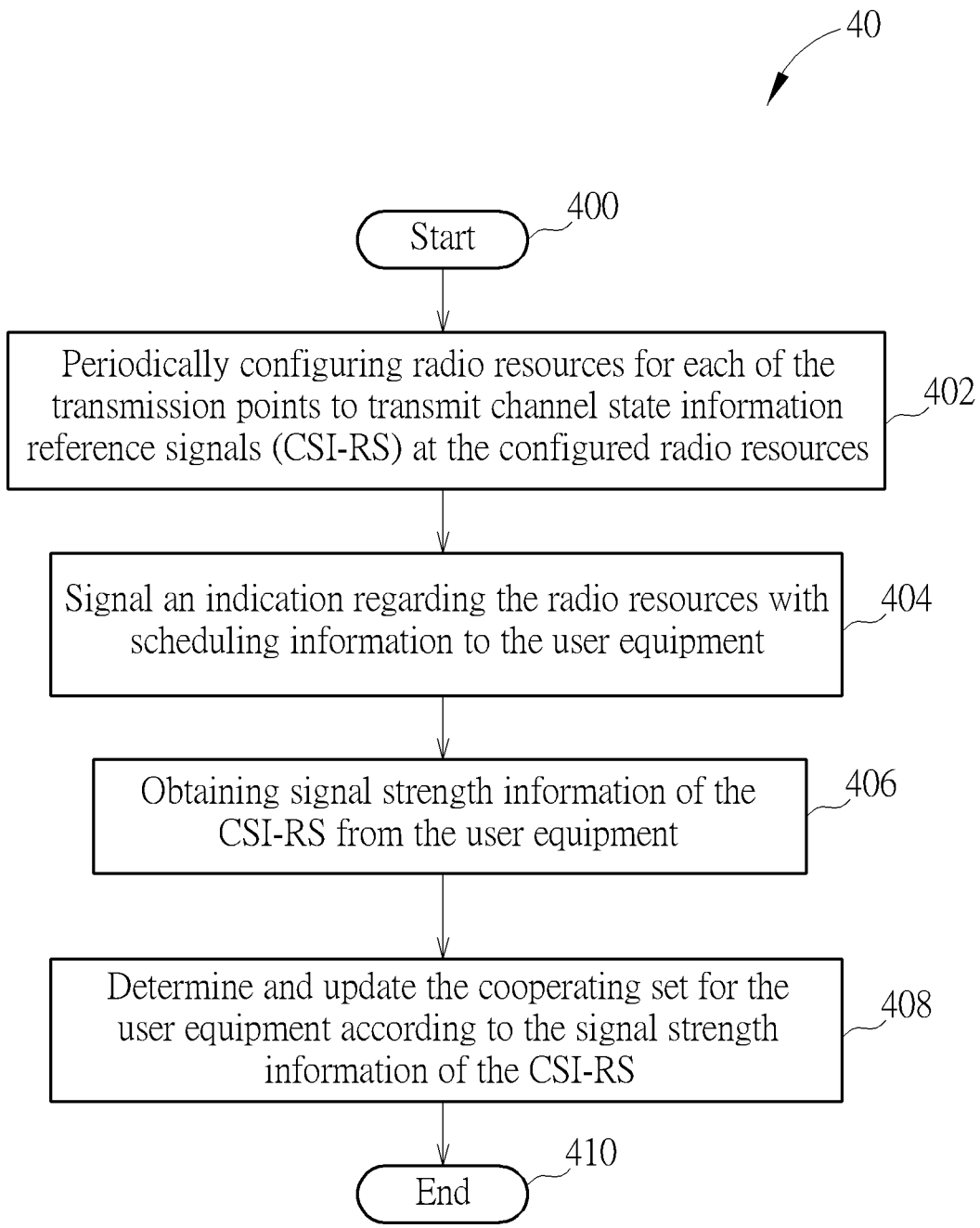
FIG. 4 is a flowchart of a process according to an example of the present invention.

In an embodiment, the step of periodically updating a cooperating set of CoMP for a user equipment of the wireless communication system 10 may further include periodically measuring signal strengths of received signals at the user equipment, and is not limited thereto. Please refer to FIG. 4, which is a flowchart of a process 40 according to an example of the present invention. The process 40 is an example for periodically updating a cooperating set of CoMP for the user equipment of the wireless communication system 10. The process 40 may be realized by the network through, a central node, the cooperation of serving points among some or all of the transmission points, or a switching center such as a mobility management entity (MME) or a radio network controller (RNC), and is not limited herein. The process 40 is implemented by the communication device 20 and may be compiled into the program code 214. The process 40 includes the following steps:

Step 400: Start.

Step 402: Periodically configuring radio resources for each of the transmission points to transmit channel state information reference signals (CSI-RS) at the configured radio resources.

Step 404: Signal an indication regarding the radio resources with scheduling information to the user equipment.

Step 406: Obtaining signal strength information of the CSI-RS from the user equipment.

Step 408: Determine and update the cooperating set for the user equipment according to the signal strength information of the CSI-RS.

Step 410: End.

According to the process 40, the network may periodically configure the radio resources for each of the transmission points, and then the transmission points may transmit CSI-RS according to the configuration. In addition, the network may signal an indication to the user equipment, wherein the indication may include the configuration of the radiation resources for each of the transmission points and the scheduling information, such as periodicity of the CSI-RS. After the user equipment receives the CSI-RS and measures the signal strengths of the CSI-RS according to the indication, the user equipment may generate a report including the signal strength information to the network so that the network can determine the cooperating set for the user equipment periodically.

In detail, the network may periodically configure the transmissions of each transmission point to non-overlapping radio resources, e.g., one or more CSI-RS configurations. The network may signal an indication regarding to one or more units of the non-overlapping radio resources with scheduling information for a user equipment. The report generated by the user equipment preferably includes reference signal received power (RSRP) and reference signal received quality (RSRQ) defined in 3GPP Rel-10. Accordingly, the network may determine an optimized cooperating set for the user equipment based on the channel conditions of that time.

Besides, when a transmission point is transmitting one CSI-RS configuration, all of the other transmission points may be mute on this CSI-RS configuration. Then, the network may indicate each user equipment to measure the RSRP or RSRQ and report the measurement result. Preferably, the network assigns the transmission points which are reported as having more transmission power by the user equipment.

The scheduling information may be indicated by a CSI-RS subframe configuration indicator $I_{CSI-RS}$ defined in 3GPP Rel-10. Table 1 below lists an example of the quantities.

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

For example, when the CSI-RS subframe configuration indicator $I_{CSI-RS}$ is 3 (i.e., between 0-4), the network configures the CSI-RS at every 5 sub-frames, starting from the $3^{rd}$ (i.e., $I_{CSI-RS}$=3) sub-frame, for each transmission point. When the CSI-RS subframe configuration indicator $I_{CSI-RS}$ is 14 (i.e., between 5-14), the network configures the CSI-RS at every 10 sub-frames, starting from the $9^{th}$ (i.e., $I_{CSI-RS}$−5=9) sub-frame, for each transmission point.

Note that, the process 40 is an example of the present invention, and is not limited thereto. Those skilled in the art should readily make combinations, modifications and/or alterations based on the abovementioned description and examples. For example, the indication regarding the radio resources with scheduling information may be corresponding to the radio resources within a specific sub-frame. However, when a number of the transmission points or a number of the CoMP schemes is larger than a specific value, the indication regarding the radio resources with scheduling information may be corresponding to the radio resources within more than one specific sub-frame. For example, the network may send more than one CSI-RS subframe configuration indicator $I_{CSI-RS}$ which represents more than one specific sub-frame to the user equipment.

In addition, the indication may be corresponding to the radio resources within one specific sub-frame and assign CSI-RS configurations in different physical resource block (PRB) sets within the specific sub-frame to different transmission points. For example, if the user equipment needs to measure 15 transmission points, the network may divide all of available PRBs into two sets, and then assign 10 CSI-RS configurations in the first set of the available PRBs to 10 transmission points and 5 CSI-RS configurations in the second set of the available PRBs to the remaining 5 transmission points. Consequently, the network may need to specify a mapping table of the CSI-RS configurations and the PRB sets to the user equipment, and require the user equipment to measure the signal strength information on the PRBs according to the mapping table.

Moreover, the indication may be corresponding to the radio resources within one specific sub-frame and an antenna port information of the transmission points when a number of transmission points is larger than a specific value. For example, if the number of transmission points is between 11 and 20, the network may indicate the radio resources within one specific sub-frame and utilize the 2-antenna port configuration, which defines up to 20 CSI-RS configurations in each PRB. Therefore, up to 20 transmission points in the wireless communication system can be supported for determining a cooperating set of CoMP.

Besides, in an embodiment, the network may indicate multiple transmission points to transmit CSI-RS at the same radio resource (e.g. the same CSI-RS configuration) by different antenna ports. Then, the network may signal an indication corresponding to the radio resources within one specific sub-frame to a user equipment. This embodiment is applicable since a cooperating set of CoMP is determined based on signals received at the user equipment. Therefore, the determination of the cooperating set is irrelevant to the antenna ports, and different transmission points may use different antenna ports for transmitting the CSI-RS. For example, if each of the transmission points has four antenna ports, up to 40 transmission points in the wireless communication system can be supported for determining a cooperating set of CoMP.

The above-mentioned steps of the processes 30, 40 including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 20.

To sum up, the present invention provides a method for managing the cooperating set of CoMP through periodically updating the cooperating set for each user equipment by a network in a wireless communication system. The network may update the cooperating set by extending the functionality of CSI-RS, e.g., signal strengths of the CSI-RS. Therefore, the present invention can determine the cooperating set for the user equipments in the time-variant communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing cooperating set for a network in a wireless communication system supporting a technology of coordinated multipoint (CoMP) transmission/reception, the method comprising:
   at least one communication apparatus in the network periodically updating a cooperating set of CoMP for a user equipment of the wireless communication system;
   wherein the cooperating set of CoMP represents a set of transmission points directly and/or indirectly participating in data transmission to the user equipment in the wireless communication system,
   wherein the at least one communication apparatus is a Node-B (NB) or an evolved NB (eNB);
   wherein the step of periodically updating a cooperating set of CoMP for the user equipment of the wireless communication system comprises:
      periodically configuring radio resources for each of the transmission points to transmit channel state information reference signals (CSI-RS) to the user equipment using the configured radio resources;
      signaling an indication regarding the radio resources with scheduling information to the user equipment;
      the user equipment obtaining signal strength information of each of the CSI-RS; and
      determining and updating the cooperating set for the user equipment according to the signal strength information of at least one of the CSI-RS;
   wherein the indication corresponds to the radio resources within one specific sub-frame when a number of the transmission points is less than 10.

2. The method of claim 1, wherein the user equipment measures the CSI-RS according to the indication, to generate the signal strength information.

3. The method of claim 1, wherein the radio resources for each of the transmission points are non-overlapping.

4. The method of claim 1, wherein the signal strength information of the CSI-RS comprises reference signal received power (RSRP) and reference signal received quality (RSRQ).

5. The method of claim 1, wherein the indication corresponds to the radio resources within more than one specific sub-frame when a number of the transmission points is larger than 10.

6. The method of claim 1, wherein the indication corresponds to the radio resources within one specific sub-frame and sub-bands corresponding to each radio resource when a number of the transmission points is larger than 10.

7. The method of claim 1, wherein the indication corresponds to the radio resources within one specific sub-frame and an antenna port information of the transmission points when a number of the transmission points is larger than 10.

8. The method of claim 1, further comprising:
   indicating the transmission points to transmit CSI-RS at the same radio resources and use different antenna ports, and signaling an indication corresponding to the radio resources within one specific sub-frame to the user equipment, when a number of the transmission points is larger than 10.

9. The method of claim 1, wherein the scheduling information is indicated by a CSI-RS subframe configuration indicator.

10. The method of claim 1, wherein the transmission point is a remote radio head, a base station, a relay node, an eNB, a pico eNB, home eNB or a remote antenna of a base station.

11. A communication apparatus of managing cooperating set for a network in a wireless communication system supporting a technology of coordinated multipoint (CoMP) transmission/reception, the communication apparatus comprising:
   a processing means;
   a storage unit; and
   a program code, stored in the storage unit, wherein the program code instructs the processing unit to execute the following steps:
      periodically updating a cooperating set of CoMP for a user equipment of the wireless communication system;
      wherein the cooperating set of CoMP represents a set of transmission points directly and/or indirectly participating in data transmission to the user equipment in the wireless communication system,
      wherein the communication apparatus is a Node-B (NB) or an evolved NB (eNB);
   wherein the step of periodically updating a cooperating set of CoMP for the user equipment of the wireless communication system comprises:
      periodically configuring radio resources for each of the transmission points to transmit channel state information reference signals (CSI-RS) to the user equipment using the configured radio resources;
      signaling an indication regarding the radio resources with scheduling information to the user equipment
      determining and updating the cooperating set for the user equipment according to signal strength information of at least one of the CSI-RS, wherein the signal strength information of the at least one of the CSI-RS is transmitted from the user equipment to the communication apparatus;
   wherein the indication corresponds to the radio resources within one specific sub-frame when a number of the transmission points is less than 10.

12. The communication apparatus of claim 11, wherein the user equipment measures the CSI-RS according to the indication, to generate the signal strength information.

13. The communication apparatus of claim 11, wherein the radio resources for each of the transmission points are non-overlapping.

14. The communication apparatus of claim 11, wherein the signal strength information of the CSI-RS comprises reference signal received power (RSRP) and reference signal received quality (RSRQ).

15. The communication apparatus of claim 11, wherein the indication corresponds to the radio resources within more than one specific sub-frame when a number of the transmission points is larger than 10.

16. The communication apparatus of claim 11, wherein the indication corresponds to the radio resources within one specific sub-frame and sub-bands corresponding to each radio resource when a number of the transmission points is larger than 10.

17. The communication apparatus of claim 11, wherein the indication corresponds to the radio resources within one specific sub-frame and an antenna port information of the transmission points when a number of the transmission points is larger than 10.

18. The communication apparatus of claim 11, further comprising:
   indicating the transmission points to transmit CSI-RS at the same radio resources and use different antenna ports, and signaling an indication corresponding to the radio resources within one specific sub-frame to the user equipment, when a number of the transmission points is larger than 10.

19. The communication apparatus of claim 11, wherein the scheduling information is indicated by a CSI-RS subframe configuration indicator.

20. The communication apparatus of claim 11, wherein the transmission point is a remote radio head, a base station, a relay node, an eNB, a pico eNB, home eNB or a remote antenna of a base station.

\* \* \* \* \*